US010000892B2

(12) United States Patent
Oster

(10) Patent No.: US 10,000,892 B2
(45) Date of Patent: Jun. 19, 2018

(54) EVACUATED TUBE AND CAPSULE HAVING INTERCHANGE CAPABILITY

(71) Applicant: Daryl Oster, Longmont, CO (US)

(72) Inventor: Daryl Oster, Longmont, CO (US)

( * ) Notice: Subject to any disclaimer, the term of this patent is extended or adjusted under 35 U.S.C. 154(b) by 293 days.

(21) Appl. No.: 14/832,177

(22) Filed: Aug. 21, 2015

(65) Prior Publication Data

US 2015/0360580 A1   Dec. 17, 2015

Related U.S. Application Data

(63) Continuation of application No. 13/831,497, filed on Mar. 14, 2013, now Pat. No. 9,228,298.

(51) Int. Cl.
| | |
|---|---|
| *B60L 13/04* | (2006.01) |
| *E01B 25/34* | (2006.01) |
| *B61B 13/08* | (2006.01) |
| *B61B 13/10* | (2006.01) |
| *E01B 25/30* | (2006.01) |

(52) U.S. Cl.
CPC .............. *E01B 25/34* (2013.01); *B60L 13/04* (2013.01); *B61B 13/08* (2013.01); *B61B 13/10* (2013.01); *E01B 25/30* (2013.01); *Y02T 30/30* (2013.01)

(58) Field of Classification Search
CPC .......... B60L 13/04; B60L 13/06; B60L 13/08; B60L 13/10; B61B 13/10; B61B 13/08; E01B 25/30; E01B 25/32; E01B 25/34
USPC ......................................... 104/138.1, 130.02
See application file for complete search history.

(56) References Cited

U.S. PATENT DOCUMENTS

| | | | | | |
|---|---|---|---|---|---|
| 3,763,788 | A | * | 10/1973 | Pougue ................. | B61B 13/122 104/130.02 |
| 3,845,720 | A | * | 11/1974 | Bohn .................... | B60L 13/003 104/130.02 |
| 3,861,320 | A | * | 1/1975 | Lichtenberg ........... | B61B 13/08 104/130.02 |
| 3,874,299 | A | * | 4/1975 | Silva .................... | B60L 13/003 104/105 |
| 3,994,236 | A | * | 11/1976 | Dull ..................... | B60L 13/003 104/130.02 |
| 4,934,279 | A | * | 6/1990 | Azukizawa ............ | B60L 13/08 104/130.02 |

(Continued)

*Primary Examiner* — Mark T Le
(74) *Attorney, Agent, or Firm* — Kevin H. Fortin

(57) ABSTRACT

A method of interchange for an evacuated tube transport system includes tubes for enabling capsule movement within the tubes. The tubes are evacuated and the capsules magnetically levitated within the tubes. The tubes have an interchanges having diverging and converging tubes, respectively. A control system includes divergence force elements having permanent magnets that are selectively orientable polarity to enable capsule control, or electro magnets with polarity selectively switchable to enable capsule path control. The method selectively energizes the force elements to enable the capsule to diverge or converge in an interchange. An interrupter also regulates the force elements. The method activates the force elements and disables deactivation of the force elements before the capsule diverges in the interchange. The method balances divergence forces through center of gravity and through center of lift on receiving a request for divergence. The control system regulates capsule speed, spacing between capsules, and divergence timing.

3 Claims, 12 Drawing Sheets

(56) References Cited

U.S. PATENT DOCUMENTS

| | | | | | |
|---|---|---|---|---|---|
| 5,146,853 | A | * | 9/1992 | Suppes | B60L 13/10 104/138.2 |
| 5,282,424 | A | * | 2/1994 | O'Neill | B61B 13/10 104/138.1 |
| 5,517,924 | A | * | 5/1996 | He | B60L 13/10 104/130.02 |
| 5,542,356 | A | * | 8/1996 | Richert | B60L 11/182 104/130.02 |
| 5,904,101 | A | * | 5/1999 | Kuznetsov | B60L 13/10 104/130.02 |
| 6,101,952 | A | * | 8/2000 | Thornton | B60L 13/003 104/130.02 |
| 6,357,358 | B2 | * | 3/2002 | Henderson | B60L 13/04 104/130.02 |
| 7,757,609 | B2 | * | 7/2010 | Fiske | B60L 13/003 104/130.01 |

* cited by examiner

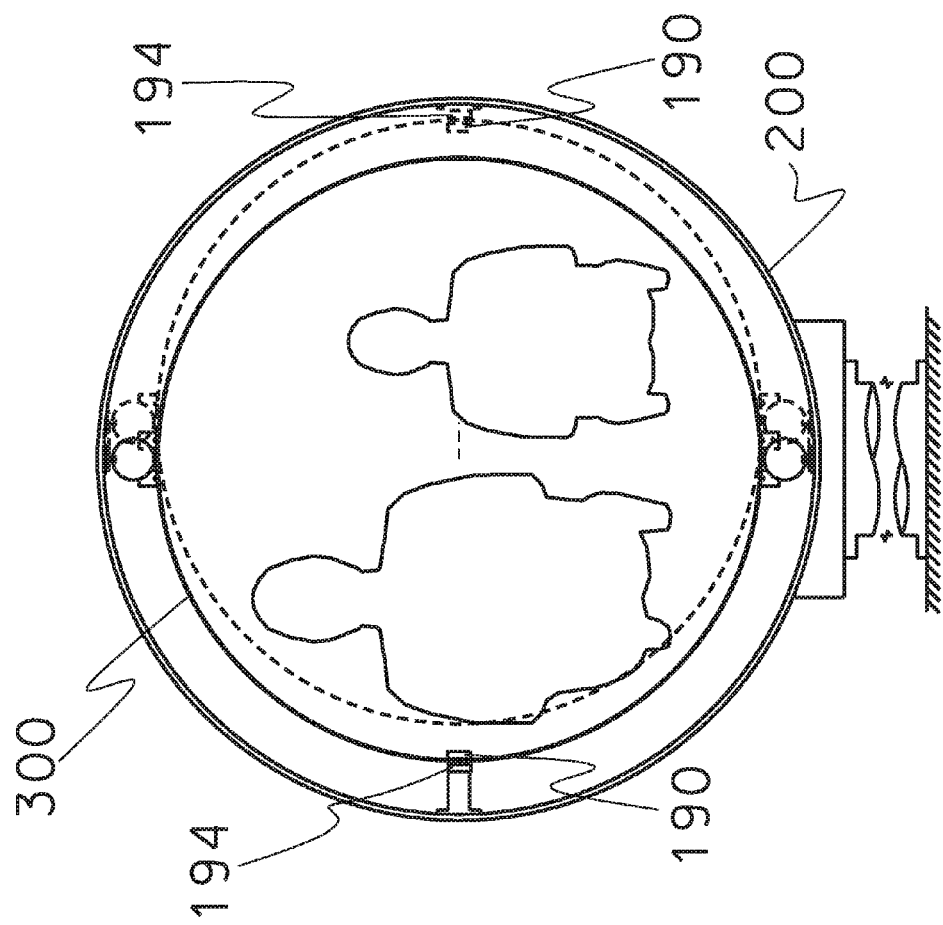

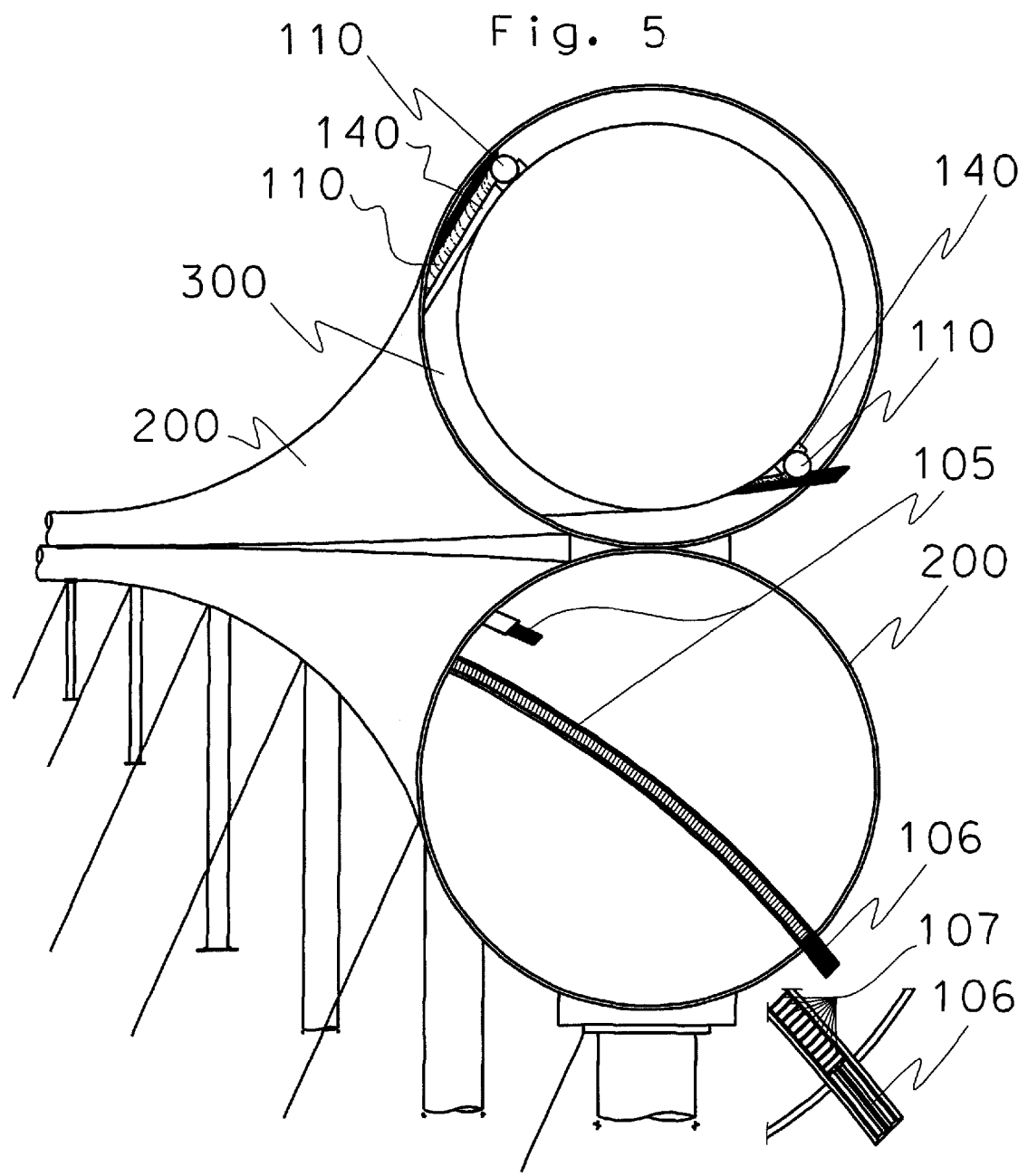

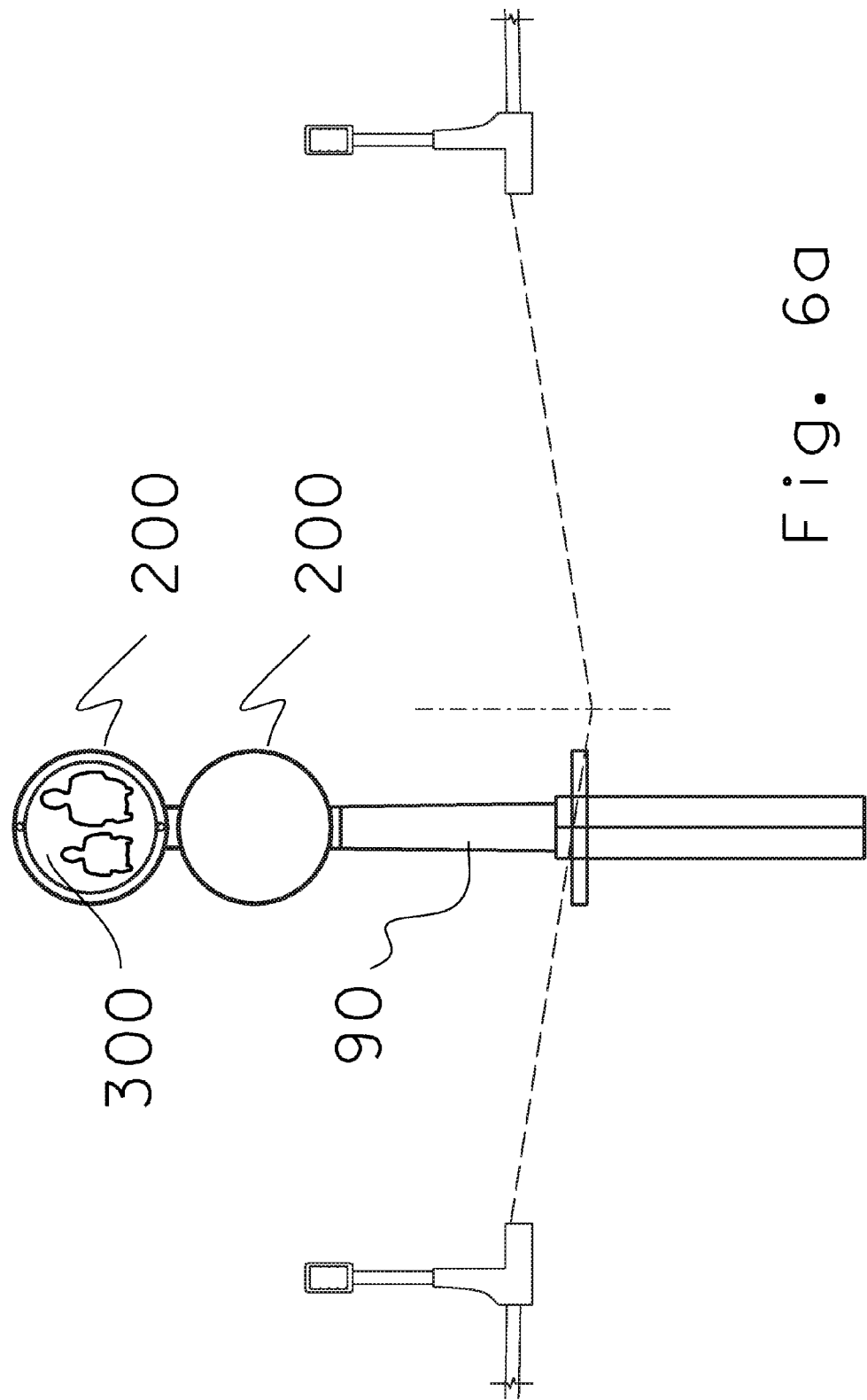

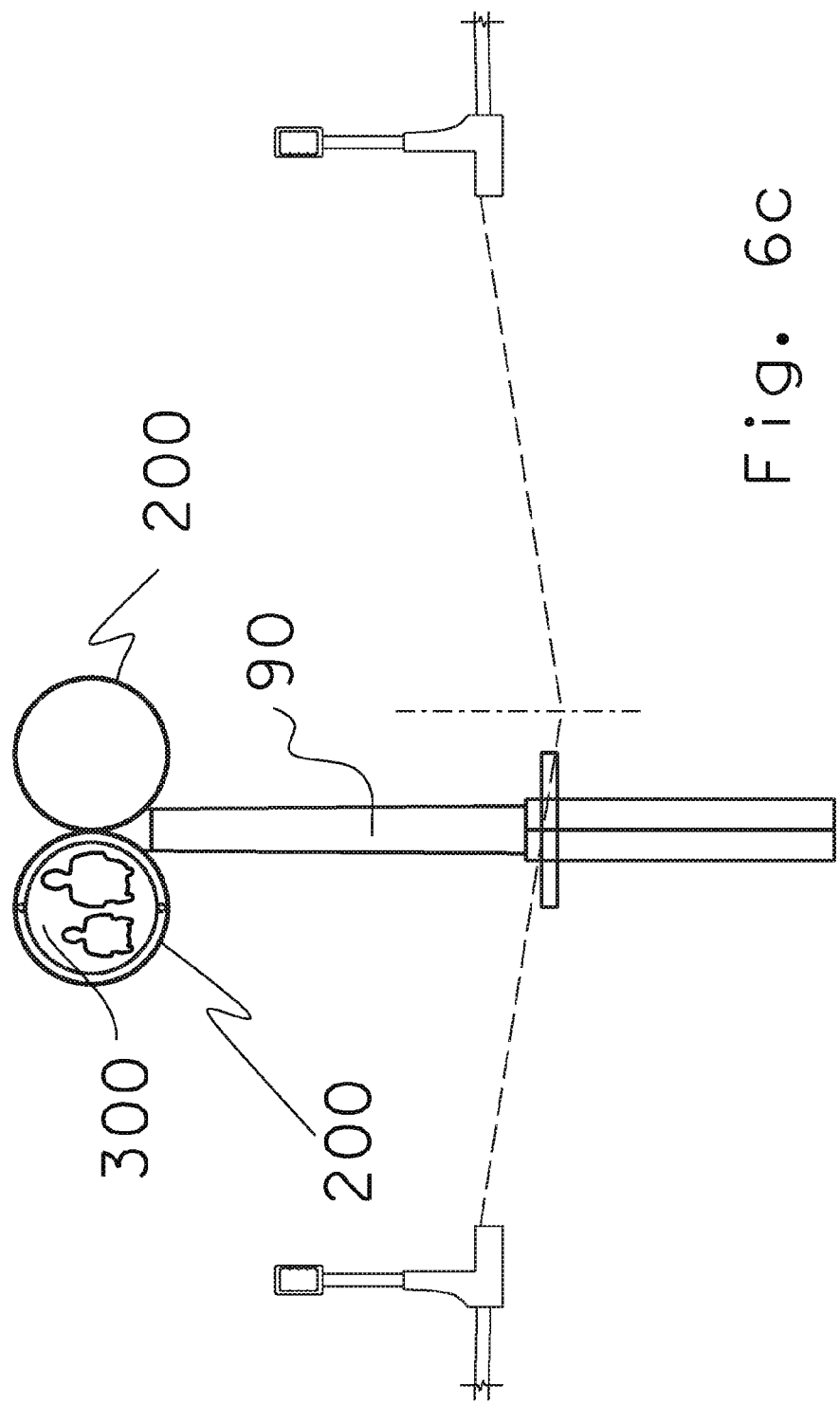

EVACUATED TUBE AND CAPSULE HAVING INTERCHANGE CAPABILITY

CROSS REFERENCE TO RELATED APPLICATIONS

This patent application is a continuation of co-pending U.S. patent application Ser. No. 13/831,497, filed 14 Mar. 2013, the disclosure of which is incorporated herein by reference. This patent application also relates in subject matter to U.S. Pat. No. 9,085,304, issued on 21 Jul. 2015, and U.S. Pat. No. 5,950,543 issued 14 Sep. 1999 the disclosure of which is incorporated herein by reference.

FIELD OF THE INVENTION

The present invention relates to rapid transit utilizing magnetically levitated capsules, and particularly to energy efficient evacuated tube-transport systems.

BACKGROUND OF THE INVENTION

Automated Personal Rapid Transit (PRT), where automobile sized (or smaller) vehicles independently operate on fixed rails. Most PRT system designs use passive rails (analogous to freeways) that rely on steering equipment in the vehicle to affect divergence to an alternative branch in a way analogous to an exit on a freeway.

The field of magnetically levitated vehicle suspension (maglev) includes a variety of technologies in the market. Most maglev vehicle suspension technologies have been optimized for use in trains. Several rely upon active switch elements that are mechanically movable.

Train-type mechanical switch elements are limited in quickness, reliability and cost. Some mechanical switch elements wear over time, and reliability is dependent on the level of maintenance, which can be extensive and costly. Importantly, mechanical switch elements take time to engage, with some taking more than a second. Mechanical switch elements are inappropriate where the frequency of vehicle traffic is designed having a capacity of one vehicle per ten second interval or less, and especially those with intervals of less than one second. Also most mechanical switch elements wear considerably when operating every few minutes, instead of every few hours as with many train-based systems.

Electromagnetic Suspension (EMS) such as U.S. Pat. No. 8,234,981 B2 August 2012 Zheng et al; and U.S. Pat. No. 8,171,859 B2 May 2012 Loser et al both of Germany (Transrapid) uses feedback control of electromagnets in the vehicle interacting with soft magnetic elements in a guideway to produce attractive levitation forces. EMS is able to maintain levitation without forward movement. A drawback of EMS is that is requires a constant supply of electric energy to produce the levitation force. EMS requires constant computer control to artificially stabilize inherently unstable magnetic forces. EMS trains have some magnetic drag. The sum of the drag energy and maglev operating energy is typically greater than the rolling resistance energy of the best steel wheel trains. Most EMS systems applied to train technology require the use of mechanical switch elements in the that seriously vehicle frequency.

Several maglev technologies use Neodymium permanent magnets (NdPM) in attraction, shear, or repulsion. NdPM can be made low drag if designed to minimize magnetic eddy current drag. Since NdPM maglev is inherently unstable, it must be stabilized by other forces such as rolling elements or EDS stabilization. Some examples are: U.S. Pat. No. 7, 624,686 B2 Dec. 2009, U.S. Pat. No. 7,380,508 B2 Jun. 2008, U.S. Pat. No. 7,314,008 B2 January 2008, U.S. Pat. No. 7,484,462 Feb. 2009, U.S. Pat. No. 7,484,463 B2 Feb. 2009, U.S. Pat. No. 7,243,604 B2 Jul. 2007, and Chinese Patent Publication No. CN1264660A titled "tube vacuum permanent magnetic compensation type levitation train-elevated railway-station system" all by Lingqun Li of Dalian China; and also US 2006/0236890 and U.S. Pat. No. 7,204,192 B2 Apr. 2007 to Lamb et al (MagnaForce/Levex) of the U.S. uses NdPM in vehicles and guidance force must stabilized with contacting rollers that are subject to speed limitations, wear and possible sudden failure. U.S. Pat. No. 5,218,257 jun. 1993 to Tozoni, and U.S. Pat. No. 5,225,728 Jul. 1993 to Oshima of Japan both claim stable permanent magnet maglev, however the configurations indicated have not been effectively demonstrated to work.

U.S. Pat. No. 7,757,609, issued Jul. 2010; U.S. Pat. No. 6,684,794, issued Feb. 2004; and U.S. Pat. No. 6,374,746, issued April 2002 all to Fisk et al. uses NdPM in both the vehicle and to supply repulsive lift force, and EMS control to provide "steering" forces and stability, and the capability of full speed interchanges with converge and diverge frequency limited only by the vehicle length and speed and constant electronic measurement and control. Magtube relies on constant computer control for operation, as well as constant electrical supply to energize the electromagnetic coils. However, a constant electrical supply results in losses in electrical efficiency.

U.S. Pat. No. 7,448,327 B2 Nov. 2008 to Thornton et al. uses NdPM to provide about half of the attractive levitation force, this reduces the energy requirements of EMS, but still relies on constant computer control and electric energy supply. M3 can levitate only up to ten times the magnet weight; and requires mechanical switching that limits vehicle frequency.

There is risk of loss of electric energy supply or computing power or stability augmentation with the above maglev systems. Failure could result in the vehicle contacting the guideway and possible damage. Most systems have crash pads made of heat resistant friction material to absorb the kinetic energy of the vehicle in the event of a crash.

Electrodynamic Suspension (EDS) maglev can be configured so that mechanical switches are not required to inject vehicles into the flow of traffic on the guideway. EDS maglev systems can be designed to produce stable levitation without constant electric supply or constant computer control. EDS systems require forward motion of the vehicle to produce levitation. EDS maglev uses magnetic fields in the vehicle to induce electric currents in the guideway. The currents in the guideway produce an opposing magnetic field that lifts the weight of the vehicle when velocity is sufficient. An example of EDS is the Japanese National Railway maglev train that currently holds the world record maglev speed. The Japanese EDS uses superconducting magnets in the vehicle interacting with an aluminum plate in the guideway. The superconducting magnets must be cooled to liquid helium temperatures so the system is expensive to operate. The magnetic drag of EDS is very high at low speed, reaching a maximum at "liftoff". The drag only diminishes with increasing speed, so at low to medium speeds the drag can result in less-than-optimal energy efficiency.

Another EDS prototype named Inductack was invented by Dr. Post of Lawrence Livermore National Lab. (U.S. Pat. No. 6,664,880 Dec. 2003, and U.S. Pat. No. 6,633,217 Oct. 2003). Inductrack uses NdPM Halbach arrays in the vehicle interacting with copper wire coils in the guideway. Inductrack prototypes have demonstrated a potential lift to drag ratio (L/D) of about 400:1 at 200 mph, this about five times the rolling resistance of a steel wheel high speed train at the same speed. A similar EDS-PM arrangement is disclosed in U.S. Pat. No. 7,950,333 B2 to Crawford et al (Disney) with no provisions for interchange or switching.

US 2008/0148988 A1, U.S. Pat. No. 8,171,858 and U.S. Pat. No. 7,562,628 all by Wamble et al (Skytran) uses NdPM elements and electric coils in a configuration allowing non-mechanical switching, however the drag force is high at low speeds, and it requires provision for touchdown at low speed or stops. The Skytran switch design has speed limitations imposed by safety and structural limitations of the converge/diverge angle (or risk of diverge failure). Further limitations of Skytran are levitation force is reduced in the zone of the diverge/converge segment necessitating double the amount of magnetic material (and/or passive lift coils) in the guideway and/or vehicle. A further limitation is that in the diverge zone of the switch, active electric magnetic force (with position control feedback) is required to counter the unbalanced passive repulsion force on the continuation path side if the vehicle is desired to continue on; or to supply active electromagnetic divergence force and electronic sensing and control for a diverge to occur. If electronic sensing and force control is not used, rollers or skids are required to prevent unwanted contact with magnetic components. Very high reserve forces in the electromagnetic elements in a diverge zone are required to counter variable side wind forces acting on the vehicle. Yet another limitation is that the steering forces do not act on the center of gravity of the vehicle, and swinging of the vehicle is likely to occur from lateral switching forces and/or passenger movements or wind force. Another problem is that propulsive forces act far from the center of gravity of the vehicle potentially causing pitching excitations that require clamping force generators to overcome.

U.S. Pat. No. 5,631,617 to Morishita of Japan, and U.S. Pat. No. 7,197,987 B2 to Falter et al. of Germany disclose High Temperature Superconductor Maglev (HTSM) that uses NdPM in the guideway that interacts in attraction and/or repulsion with diamagnetic YBCO (Yttrium-Barium-Copper-Oxide) superconductive bulk crystals in the vehicle. HTSM levitation is capable of producing attractive force, repulsive force, and shear force between the superconductive (SC) elements and the Permanent magnet (PM) elements in the guideway. HTSM levitation force and restoring force is dependent on the magnetic force gradient. For HTSM to function the SC elements (for instance YBCO) must be maintained at cryogenic temperatures (below 91 Kelvin in the case of YBCO) to enter the superconductive state. HTSM was first demonstrated to carry passengers by the inventor WANG Jaisu a professor of South West Jaiotoung (transportation) University (SWJTU) in Chengdu China 31 Dec. 1999. Prof. Wang has been granted several patents in China that relate to HTSM. Wang's HTSM is very stable without computer control or energy supply. The HTSM prototype exhibited very stiff suspension in the vertical direction, and had a small degree of freedom (about 5 mm) in the lateral direction with only a few Newtons of force, and then encountered very stiff resistance requiring over 5000N displacing another 5 mm in the lateral direction. The prototype HTSM by Wang was not optimized to reduce cost or magnetic drag force. Furthermore, the HTSM prototype at SWJTU has a problem (especially during times of humid air conditions) of ice forming on the cold surface of the vehicle immediately above the suspension gap. HTSM configured to operate in the open environment is also subject to stray ferromagnetic material being attracted to attach to the permanent magnets in the guideway and pose a risk to passing vehicles. NdPM is subject to corrosion problems in the open air, and NdPM is usually plaited with corrosion resistant metals to help prolong service life of NdPM elements exposed to the atmosphere. Metallic plaiting can contribute to increased drag force.

U.S. Pat. No. 6,418,857 Jul. 2002 Okano et al. of Japan, makes use of vacuum to mitigate the frosting and magnetic attraction and corrosion problems of HTSM, however another problem remains: the use of liquid nitrogen (LN2) as a heat sink to maintain temperatures below 91 Kelvin necessary for HTSM function. The use of LN2 for ETT-HTSM is not optimal due to the large volume change of gas phase compared to liquid phase. Use of LN2 for ETT-HTSM would necessitate either onboard compression and storage (heavy, expensive, and energy intensive); or release of the N2 gas to the evacuated environment in the tubes (loading the vacuum pumps and dramatically increasing energy use). The HTSM prototype by Wang used about 35 liters of LN2 during the maximum levitation time of 7 hours. The LN2 boils away and is vented to the atmosphere. While not a poison, N2 gas can displace oxygen in enclosed spaces and result in asphyxiation. Okano provides no way to interchange vehicles.

Experience with rotary HTSM bearings has shown that the L/D can be as high as a hundred million. The HTSM prototype in Chengdu required a large quantity of expensive neodymium permanent magnets (NdPM), and used a configuration of NdPM that produced significant drag force resulting in a L/D of about 1000:1.

HTSM configurations that use High energy Neodymium PM material (NdPM) in Halbach arrays to focus the magnetic force and thereby reduce the quantity of magnetic material necessary to generate a levitation force; and do not require electrically conductive soft magnetic elements that exhibit increased eddy current drag.

SUMMARY OF THE INVENTION

The present invention seeks ultimately minimize energy consumption required for transportation systems, and to provide capsules, tubes and interchange components that can be used in ETT systems. The present invention also enables high frequency capsule movement within the evacuated tubes. The present invention overcomes many limitations of the prior systems, while exhibiting many useful advantages as will become evident in this disclosure.

The present invention focuses on the field of automated transportation of goods and passengers in magnetically levitated capsules independently operating in evacuated tubes. The field has not yet been widely commercialized; however it has the potential to dramatically reduce transportation construction and operating costs if properly optimized for maximum transportation value. In particular, significant cost savings are realized through transportation energy efficiency. Other cost savings are realized by lowering the capital costs for construction.

Various benefits of the High Temperature Superconductor Maglev (HTSM) for Evacuated Tube Transport (ETT) with a magnetic levitation structure for ETT capsule vehicles traveling in an evacuated tube in accordance with the present invention are set forth below:

The capsules are designed to be light weight structure with a very low drag force thereon, which minimizes energy consumption required for transportation. Further, operation is not dependent on constant electric supply or constant computer control, which further reduces energy consumption.

A further energy-saving aspect of the present invention is to use solid-liquid phase change instead of liquid-gas phase change in order to maintain cryogenic temperatures necessary for superconductivity.

Construction costs are minimized by optimization of the levitation gap, and reduction of cross-sectional areas.

Still another benefit of the present invention is to dispense with any limitation on the design speed during converge or diverge operation during an interchange of tubes.

A further benefit of the present invention is to avoid the necessity of any mechanical or electrical switch elements to be used in the tube, which reduces the cost of construction.

A performance benefit of the present invention is to provide ultra-stability to capsule vehicles in roll, pitch and yaw. Another performance benefit of the present invention is to ensure that there is no reduction of levitation force during a divergence or convergence.

A safety benefit of the present invention is to use a heat sink material that does not result in emissions of gas to the capsule or evacuated environment.

In accordance with the present invention, there is provided a High Temperature Superconductor Maglev (HTSM) for Evacuated Tube Transport (ETT) with a magnetic levitation structure for ETT capsule vehicles traveling in an evacuated tube . The magnetic levitation structure comprises:
(a) at least one evacuated tube guideway supported on support structures at intervals;
(b) at least one ETT capsule traveling within the evacuated tube guideway;
(c) an upper and a lower cryostat respectively mounted at the top and bottom of the ETT capsule along the length thereof;
(d) at least a plurality of superconductor levitation force elements divided between the upper and lower cryostats, the levitation force being spread over the length of capsule, however substantially concentrated in a compact cross-sectional area;
(e) at least a pair of permanent magnetic elements mounted at the top and bottom of the evacuated tube guideway to stably levitate the capsule within the tube guideway;
(f) at least a pair of capsule based switchable diverge force elements; and
(g) at least a pair of tube based diverge force elements.

Typically, the cryostat is mounted internally on the capsule to pass through a cylindrical airlock with minimal time and energy.

Typically, the cryostat is mounted externally on the capsule to prevent any harm to occupants by leakage of material and to make more space available in the capsule.

The cryostat is made of an electrically non-conductive material and configured in a cylindrical shape to house the superconductor elements for use in linear induction motor/generator for capsule acceleration/deceleration, the material providing sufficient strength and stiffness to resist internal pressure, thermal stresses and levitation forces.

Typically, the cryostat is mounted on the ETT capsule by means of insular mounting elements and the levitation force imparted to semiconductor element is transferred via a force transfer structure to cryostat and from cryostat to ETT capsule without providing a heat path from cryostat to capsule.

Typically, the cryostat is mounted on the surface of the ETT capsule by means of removable mounting element, configured as quickly removable magnetic force attachment means for ensuring ultra-insulated and ultra-dry conditions of the evacuated environment and to allow transfer of the capsules through the airlock by removing the cryostat from the inbound capsules while in the evacuated environment and before the capsule enters the airlock. This offers energy savings by allowing the capsule to displace virtually all of the air in the airlock; therefore less electrical energy is required for vacuum pumps on each airlock cycle.

The cryostat, in one embodiment of the invention, contains superconductor elements made of Yttrium-Barium-Copper-Oxide (YBCO) crystals or vapor deposited YBCO films, or any other superconductive materials with a high critical current density known to those versed in the arts.

The sealed cryostat contains a cryogenic solid-liquid (SL) phase change material whereby the superconductor elements are cooled by means of the cyrogenic heat-sink substance or a coolant having a solid-liquid phase change (melting cycle).

The cryostat interfaces with automated cryostat handling and re-freeze equipment that replaces any re-frozen cryostat onto outbound ETT capsules; removable cryostats allows the use of an airlock only slightly larger diameter than the capsule in order to minimize airlock cycle time due to nearly complete air displacement by the capsule in the airlock chamber.

The solid-liquid phase change material is placed in the cryostat with expansion mitigation means for always keeping the solid-liquid phase change material in contact with the superconductor elements for allowing expansion and contraction of the liquid and/or solid material during normal operation and handling and during the necessary thermal cycling of a plurality of melting and re-freezing cycles.

The expansion mitigation means is configured as an empty space or a flexible membrane separating a portion of the cryostat or a compressible billow type of structure for allowing changes in volume without applying damaging pressures to the cryostat.

Alternatively, the cryostat is provided with reaction members as moving part of linear electric motor (LEM)/linear electric generator (LEG) having coil elements mounted on tube guideway.

A plurality of permanent magnetic elements are secured to the tube guideway by permanent magnet mounts, which are non-conductive to allow precision alignment of the permanent magnetic elements with respect to the tube structure to compensate for any manufacturing irregularities of the tube surface or diameter while maintaining the permanent magnetic elements in proper alignment to produce uniform levitation force on the capsule components. The magnet mounts are secured to the wall of the tube by any known means including but not limited to: adhesives, embedded elements, or threaded or riveted fasteners.

In one embodiment, the permanent magnetic elements are divided into smaller units in the linear direction with slight space between the elements. A spacer is interposed between each of the permanent magnet elements. The spacers are made from a material that is both elastic and dielectric. Spacer elasticity compensates for linear movements caused by thermal variations and/or minor geological forces.

The dielectric aspect of the spacers reduces magnetic drag forces and improves lightning protection by reducing electrical conductivity in the linear direction along the tube so that any electromagnetic pulse with a high orthogonal potential will not cause harmful electric currents in the linear direction. Another benefit of the dielectric spacers is that harmful magnetic forces that could damage the magnets, holders, or tube structure are inhibited by the dielectric material limiting electrical conductivity in the linear direction along the tube.

The cryogenic solid/liquid phase change material is a heat-sink material selected from the group comprising of propane, propane mixtures, or other materials that melt at any temperature below the transition temperature of the superconductor material. Propane and most other flammable materials require oxygen for combustion. In the evacuated environment there is virtually no oxygen. In the unlikely event of a leak of a normally combustible material from a damaged cryostat, there is reduced risk of fire compared to vehicles operating in the with open air with large quantities of fuel.

In one embodiment, a portion, up to half, of the superconductor levitation force material is replaced with permanent magnet material that is oriented in attraction in the upper cryostat and is oriented in repulsion in the lower cryostat such that sufficient stability is maintained at reduced cost.

The insular mounting element is made of thermally insulting structural material selected from the group consisting of syntactic foam, aerogel, polycarbonate foam, or other suitable insulating material.

In accordance with the present invention, there is also provided a method of interchange of High Speed High Frequency Maglev, the method comprising the steps of: automation of convergence and divergence operation between capsule traffic flows in intersecting or bifurcating branches thereof by predetermining the switching operation either before the journey or during an emergency situation in route without the occupant being able to directly control the active components in the capsule vehicle; energizing the switchable diverge force elements by permanent magnets for creating bi-stable positions to allow the capsule vehicle to either continue on tube guideway or to diverge; or a DPDT bi-stable electric switch that selectively energizes the electromagnet switch to select the capsule vehicle to either continue on tube guideway or to diverge; preventing the reorientation of the switchable diverge force elements by means of an interrupter while the capsule vehicle is approaching or is in the diverge zone; fixing predetermined speed of the capsule vehicle in the interchange zone; predetermining the divergence by activation of bi-stable magnetic diverging force elements in the capsule vehicle during the divergence of the tube guideways, the changes in divergence force only activated prior to entering the divergence zone and disabling the modification of divergence forces while capsule diverges; balancing the divergence forces through centre of gravity and through center of lift on receiving a request from the occupant of an ETT capsule for a divergence, wherein the occupant is not able to directly control the divergence force; and limiting the frequency only by predetermined speed, predetermined capsule spacing, converge timing and speed matching during the convergence of the tubes.

Typically, the control system flags the ETT capsule for removal from service and repair at the next access portal, if the switch is improperly oriented by failure, a certain lateral jerk and light impact force is produced by sudden lateral movement across the width of the permanent magnet, which is sensed by position sensors and/or accelerometers in the capsule to indicate the likelihood of a component failure in the switch elements in the capsule.

BRIEF DESCRIPTION OF THE DRAWINGS

FIG. 2b is a HTSM cryostat externally mounted on the capsule within the box noted in FIG. 2a.

FIG. 3b is a cross-sectional view of a cryostat mounted within the box noted in FIG. 3a.

FIG. 4b is a cross sectional view of a capsule moving in the tube at the interchange of FIG. 4a with the dotted line showing lateral movement caused by the tube based lateral force elements.

FIG. 5 is a cutaway view of a curve section of double tube with a capsule in the upper tube.

FIGS. 6a, 6b and 6c show typical sections of the double tube ETT in three different sections, i.e. in a highway median, in an optional low profile configuration and in an optional double pair to miss utility.

DETAILED DESCRIPTION

Figure 1:
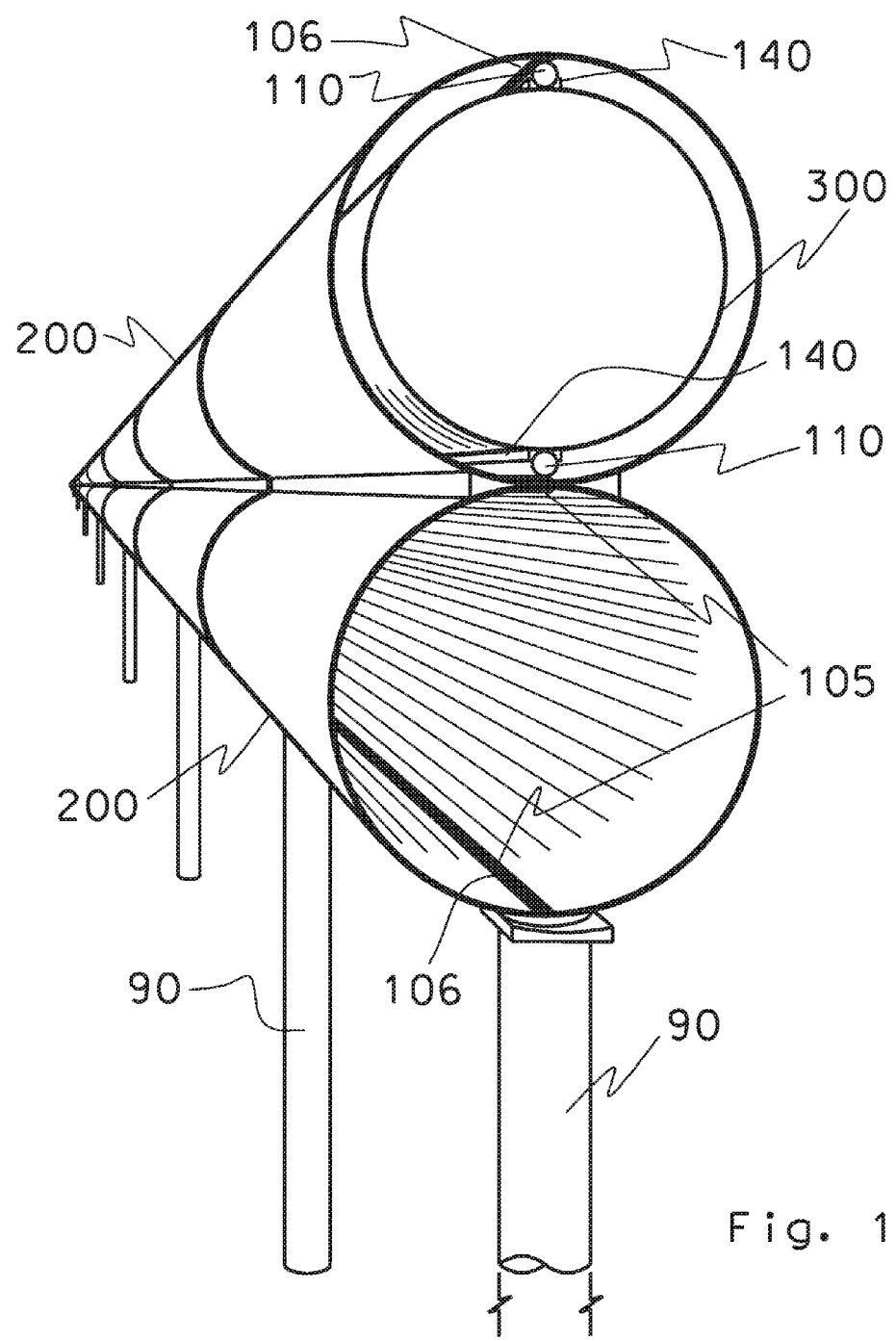
FIG. 1 is a perspective view of a typical High Temperature Superconductor Maglev (HTSM) for Evacuated Tube Transport (ETT).

FIG. 1 shows a pair of tubes 200 stretching across a landscape. The tubes mount on pillars 90 and are shown above ground. Above-ground construction reduces costs and eases maintenance and inspections. It can be appreciated that below ground and underwater mounting of the tubes 200 is also viable in accordance with the present invention.

The pair of tubes 200 enables simultaneous transport of capsules 300 in opposite directions.

Figure 2A:
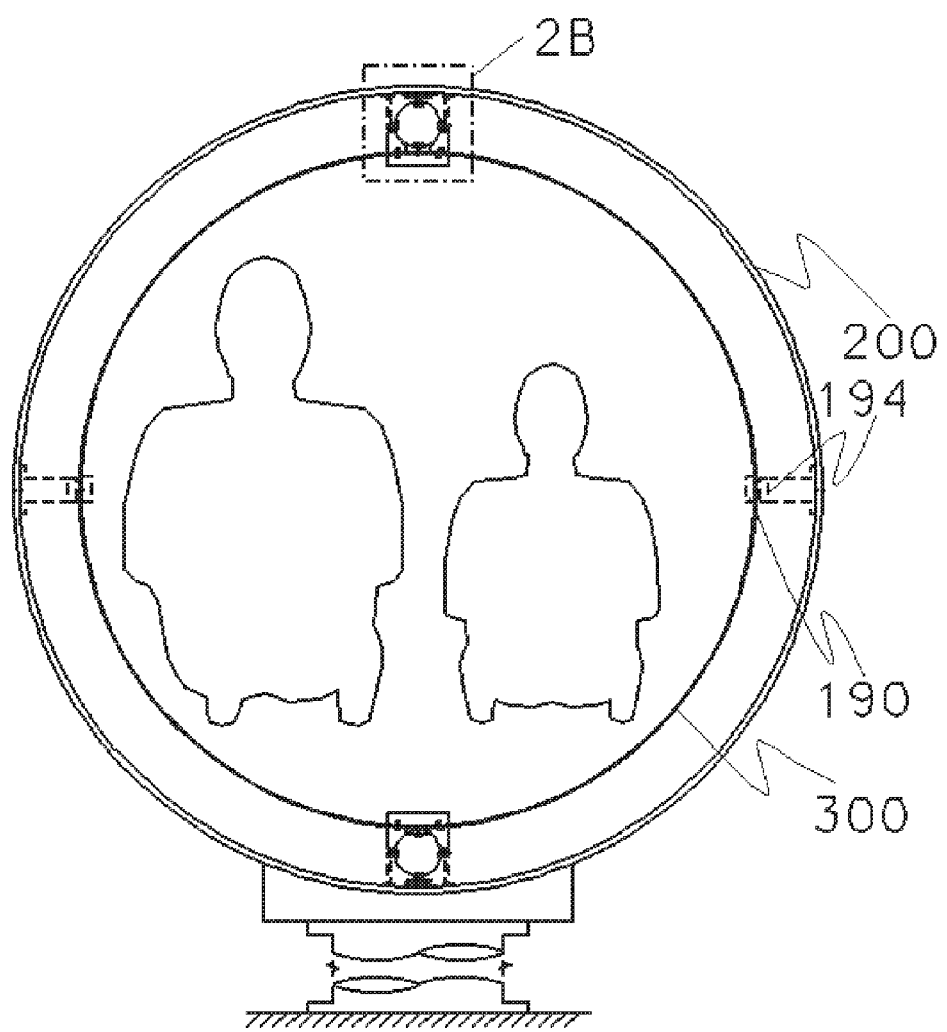
FIG. 2a is a cross-sectional view of HTSM shown in FIG. 1 with one of the tubes accommodating an ETT capsule.

FIG. 2a shows a cross-section of a capsule 300. The capsule 300 levitates in the tube 200. The tube includes diverge force elements 194. The capsule 300 includes switchable diverge force elements 190.

The tube 200 has a circular cross-section and sized having a diameter to accommodate two passengers seated shoulder-to-shoulder. A superconductor (SC) element 100 mounts in opposing arrangement on the external surface of the capsule 300.

Figure 2B:
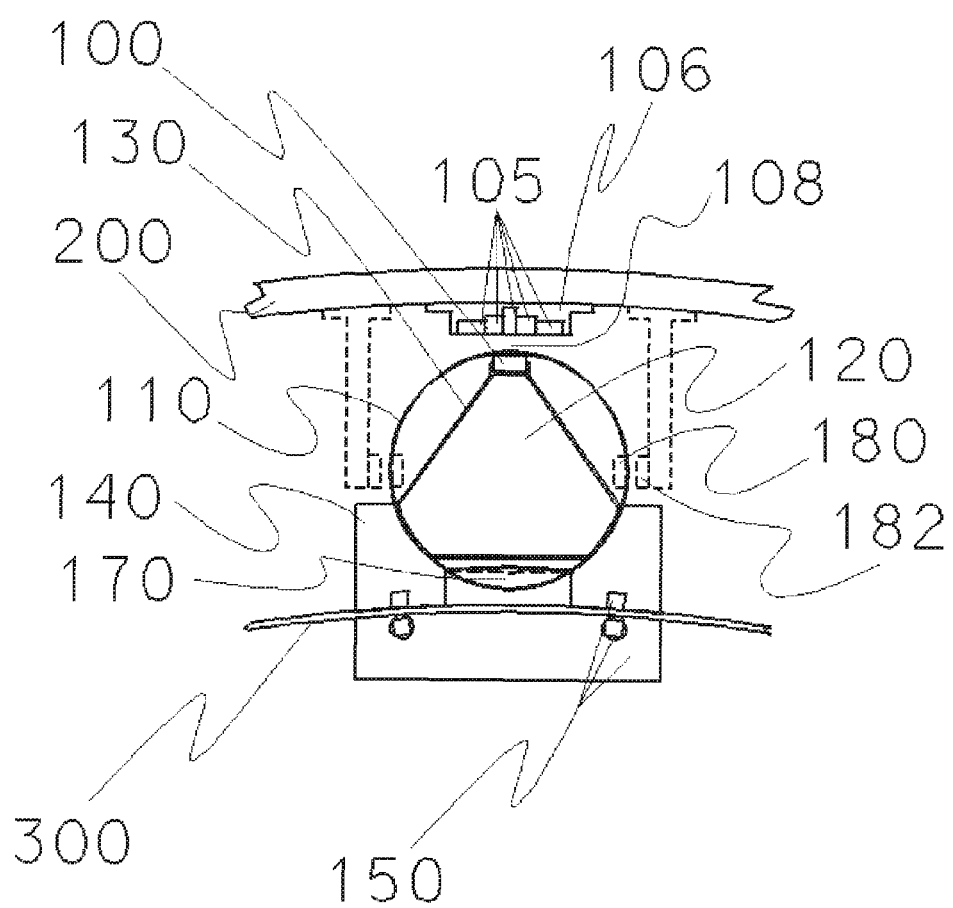

FIG. 2b shows a cross-section of the superconductor (SC) element 100, which includes permanent magnets 105, a mounting element 106, a levitation gap 108 and a cryostat 110. FIG. 2b also includes coolant 120, insular mounting elements 140 and removable mounting elements 150.

Figure 3A:
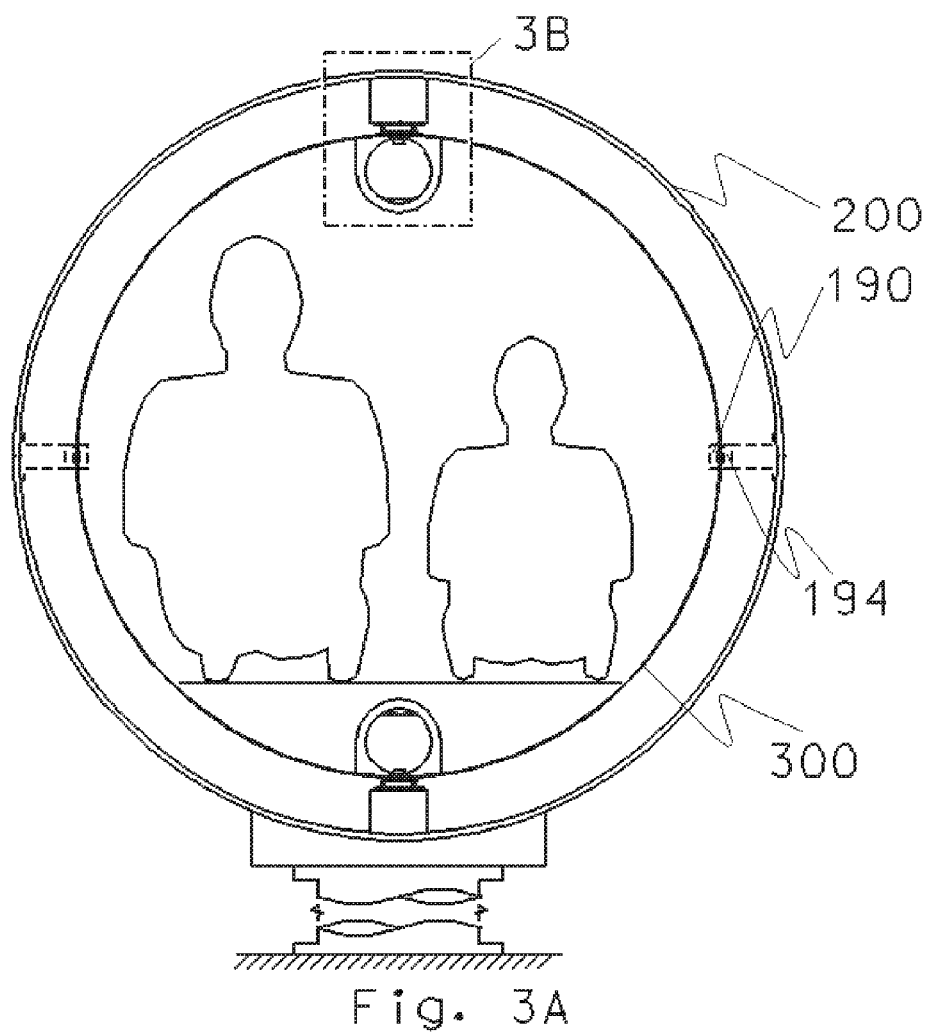
FIG. 3a is a cross-sectional view of HTSM shown in FIG. 1 with one of the tubes accommodating an ETT capsule with internally mounted cryostat configuration.

FIG. 3a shows a cross-section of the tube 200 holding the permanent magnet element 106 within the evacuated tube way. The cryostat 110 mounts within the interior of the capsule 300.

Figure 3B:
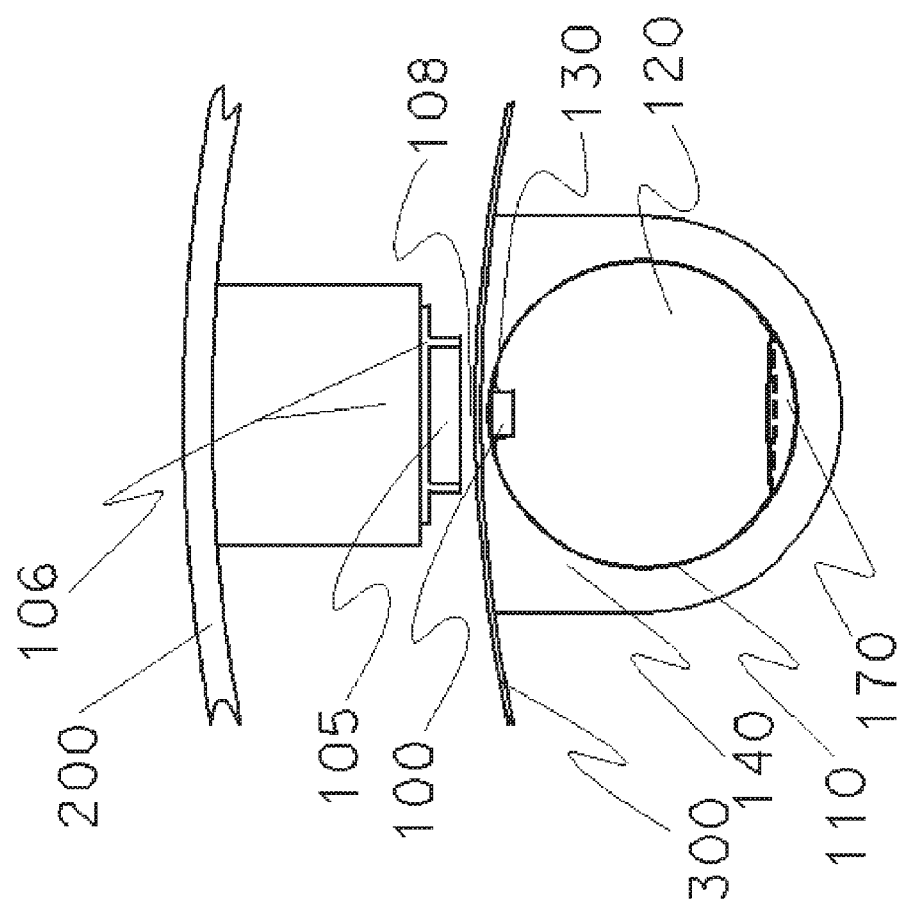

FIG. 3b shows an enlarged view of the tube 200, the permanent magnet element 106, the capsule 300 and the cryostat 110 mounted within the capsule 300. The cryostat 110 houses superconductor elements 100. The cryostat 110 also houses coolant 120 and has expansion mitigation 170 to enable the coolant 122 expand when changing phase. The cryostat 110 also includes insular mounting elements 140 that insulate the cryostat 110 from the ambient environment within the capsule 300.

Figure 4A:
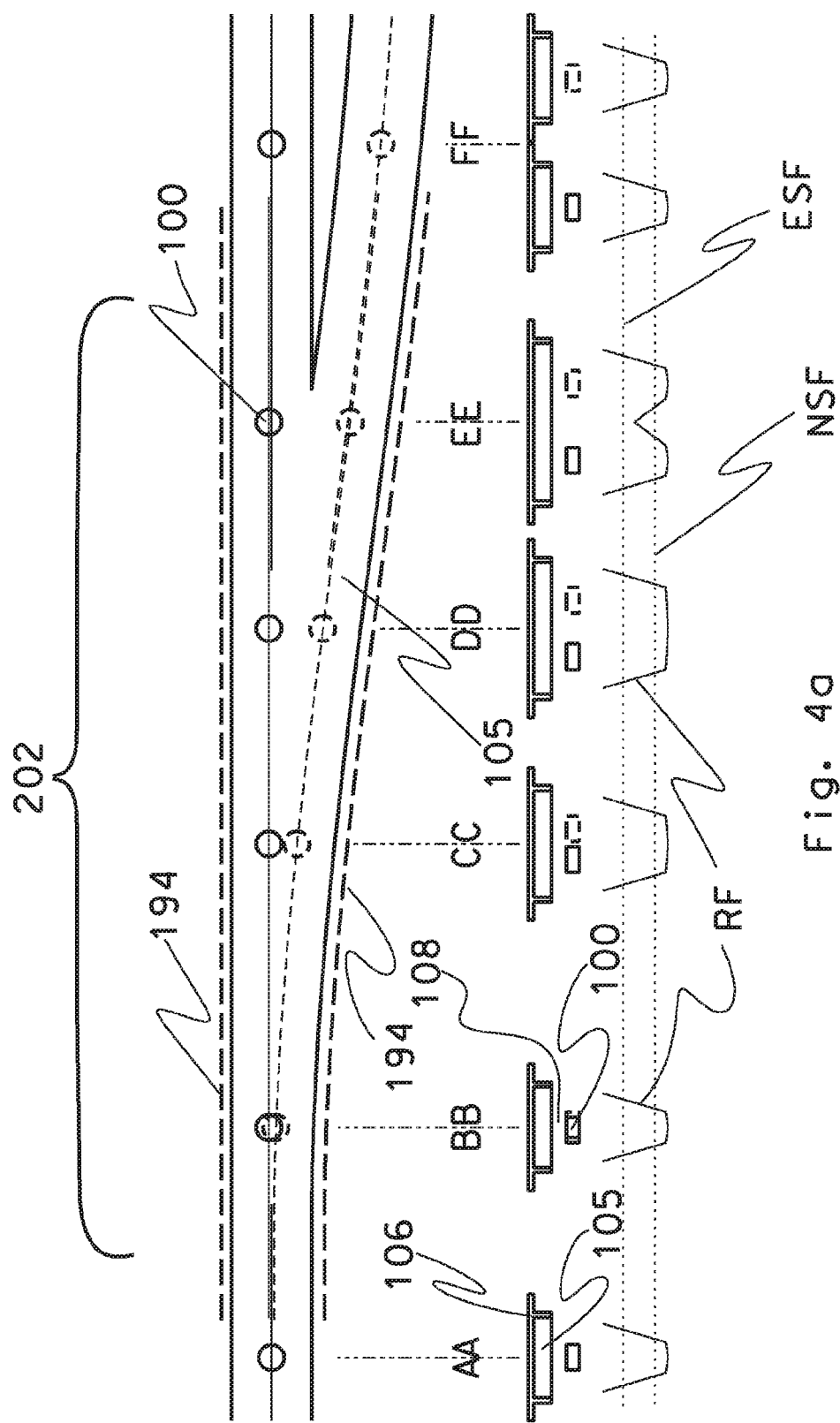
FIG. 4a is a sectional top view showing tubes at an interchange with associated lateral displacement force diagrams, with the dotted lines labeled "NSF" to indicate normal steering force level, and "ESF" for exceptional or emergency steering force level.

FIG. 4a shows the tube 200 at an interchange 202. In the interchange 202 the tube 200 diverges into two branches. The tube based divergent force elements 194 (shown with dotted lines) provide magnetic force to enable the tube based divergent force elements 194 to cooperate with the capsule-based switchable diverge force elements 192 steer the capsule into one of the divergent branches of the tube 200. The divergent branches of the tube 200 each house permanent magnets 105 to enable continued suspension of a capsule 300 moving within either branch of the tube 200.

FIG. 4b shows movement of the capsule 300 laterally during movement through the interchange 202 region of the tube 200. Lateral movement of the capsule 300 as shown by the dotted lines steers the capsule 302 one of the divergent regions of the tube 200. Such lateral movement is preprogrammed into the system so there is no need for occupants 204 to steer the capsule 300.

FIG. 5 shows an end view of two tubes 200 and vertical alignment with each other in accordance with FIG. 1. The tubes 200 curve. Accordingly the insular mounting elements 140 are aligned off-center on the top portion and the bottom portion of each tube 200. This holds each cryostat 110 in off-center alignment with the top portion in the bottom portion of each tube 200. Off-center alignment of the cryostat's cause any capsule moving through the tube 200 to rotate so as not to cause occupants or cargo in the capsule 300 to experience a side load during movement through a curve.

Figure 6B:
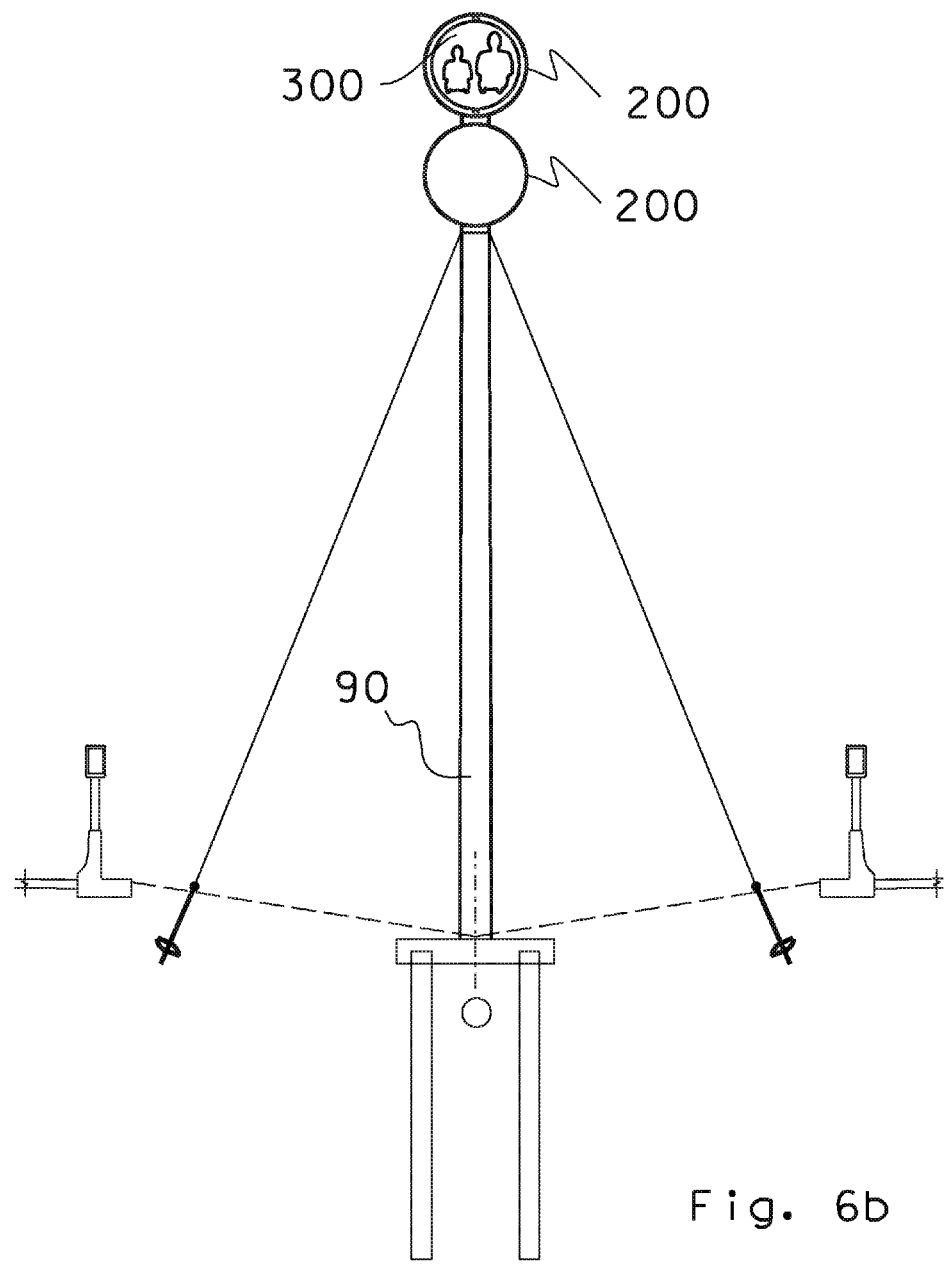

FIGS. 6a, 6b and 6c show various configurations of the tubes mounted on pillars 90. In particular FIG. 6a shows a configuration of the tubes in a highway median and the tubes 200 are in a typical vertically aligned configuration. FIG. 6b shows the tubes 200 on an extended pillar 90 to avoid utility lines, or other obstacle positioned on the ground. FIG. 6c shows a low profile configuration having the tubes 200 in lateral alignment with each other to avoid an obstacle such as an overpass, or to enable the system to fit within a tunnel.

Figure 7:
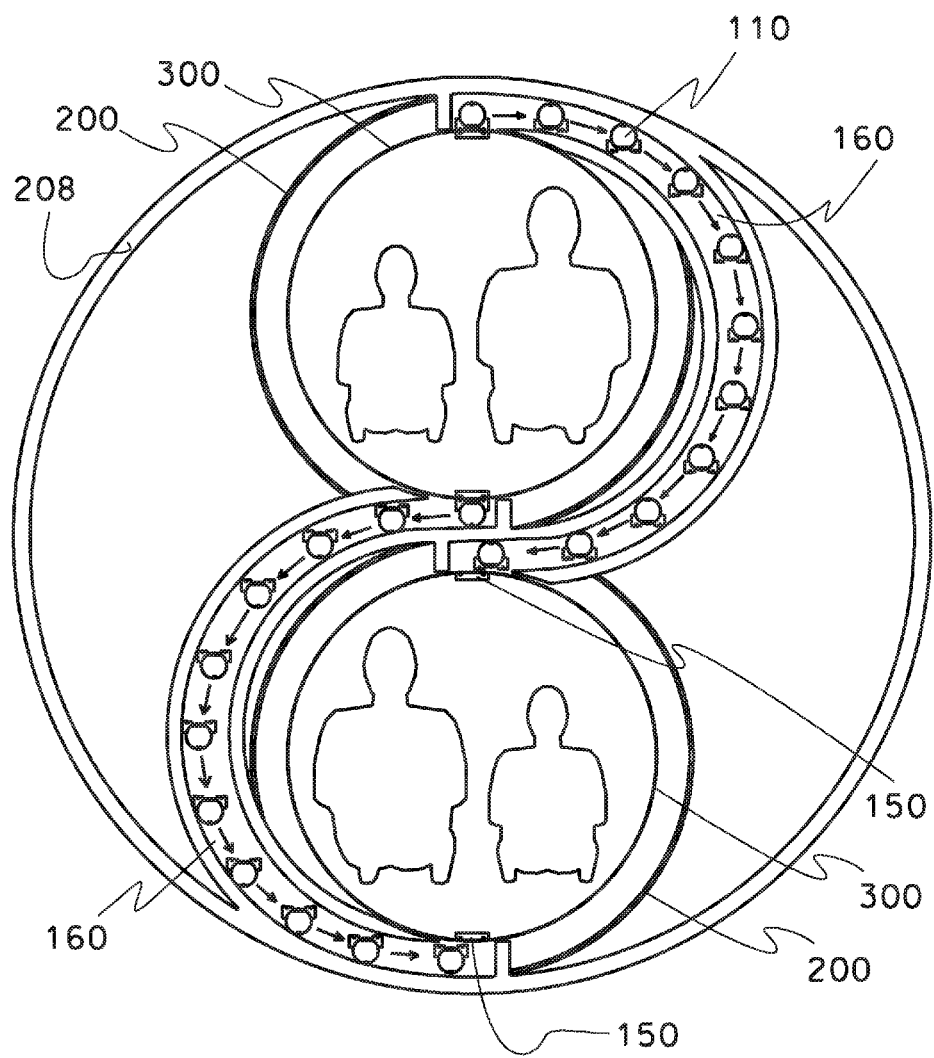
FIG. 7 shows the automated loading and unloading of cryostats from capsules docked at a cryostat exchange area.

FIG. 7 shows two tubes 200 positioned in vertical alignment within the cryostat exchange region 202. In this embodiment the cryostat exchange region 202 is a specialized exchange that allows for replacing melted cryostats with frozen cryostats for each capsule 300. The cryostat exchange region 202 includes an exchange structure 208 to resist external pressure of the evacuated cryostat exchange region 202. A transfer mechanism releases and re-attaches fully cooled cryostat 110 on to each capsule 300 while each capsule 300 remains stationary in the cryostat exchange region 202. Numerous cryostats 110 are systematically cooled and attached to and detached from capsules 300 and an evacuated environment in the interchange region 202 by means of an automated refreeze equipment 160. Each cryostat 110 attaches to the capsule 300 with a removable mounting element 150 attached at a top portion and bottom portion of the capsule 300. The cryostat exchange structure 208 resists external atmospheric pressure of the evacuated cryostat exchange region 202.

DETAILS AND OPERATION

ETT-HTSM lifting force is generated by superconductor elements 100 attached to the capsule. Many superconductor materials are known to those versed in the arts, presently the best superconductor material for HTSM is bulk Yttrium Barium Copper Oxide (YBCO) crystals or vapor deposited YBCO films. YBCO requires cryogenic cooling to temperatures below 91° K to become superconductive and produce the required levitation force when interacting with permanent magnet elements 105 that mount in the tube 200.

The cryostat 110 is a container designed to stay at the low temperature required to maintain the superconductive state of the superconductor material. It is anticipated that superconductor materials could be developed in the future that will not require cryogenic temperatures, and will be able to enter the superconductive state at ambient room temperature. To omit the need for a heat-sink and/or cryostat does not diminish the other novel objects and advantages of the present invention as will become apparent.

The cryostat 110 makes use of a solid-liquid (SL) phase change (melting cycle) coolant 113 for HTSM instead of a liquid-gas (LG) phase change (boiling cycle). To reduce the material use, thickness, and heat gain, the cryostat 110 is preferably cylindrical in shape and of a uniform diameter along the full length of the capsule 300 to be levitated. The preferred material is non-conductive to electrical energy in order to keep eddy current drag low, and able to provide sufficient strength and stiffness to resist internal pressure, thermal stresses, and levitation forces.

There are several heat-sink substances 113 that freeze below the 91° K transition temperature of YBCO to enter the superconductive state as will be apparent to those versed in the art. For instance, propane ($C_3H_8$) melts at 85.5° K; this is between the 77° K, the boiling point of LN2 and the 91° K the critical temperature ($T_c$) of YBCO. Liquids that freeze at lower temperatures have the advantage of reducing the amount of YBCO to produce a desired levitation force, but take more energy (or LN2) to refreeze, and may have a critical temperature below room temperature (resulting in risk of burst or thick heavy containment). As known to those versed in the arts, the freezing point of propane (and other appropriate liquids) can be modified by adding solutes (much as the freezing point of water is reduced by adding salt or ethylene glycol).

The cryostat 110 can be mounted externally (FIG. 2) or internally (FIG. 3) on the capsule 300. Internal mounting has the advantage of being able to pass through a cylindrical airlock with minimal time and energy; however the quantity of superconductor material 100 must be greater to provide a desired levitation force and clearance due to the added thickness of the pressure hull, and thermal insulation material.

In a preferred embodiment the cryostat 110 removably mounts external to the capsule 300, i.e. on an external surface of the capsule 300. External mounting is preferred for several reasons: any leaking material will not endanger the occupants, the insulation qualities of the evacuated environment are fully exploited to reduce the thermal heat gain thereby reducing the quantity of SL phase change material 120, more room is available in the capsule 300, less superconductor material 100 is required to produce a given levitation gap, the cryostat can be easily removed while in the vacuum environment to re-freeze, limiting thermal cycling wear and tear.

Thermally Isolated Structural Mount:

The cryostat 110 for ETT-HTSM is structurally mounted to the capsule 300 such that the levitation force imparted to the superconductor elements 100 are transferred to the cryostat via a force transfer structure 130, such as but not limited to adhesive or mechanical means, and from the cryostat to the capsule. The mounting elements 140 in contact with the cryostat are thermally isolated from the capsule by using a structural material that is resistant to thermal energy flow such as (but not limited to): aerogels or thermoplastic foams, and/or vacuum insulation as known to those in the arts. In this way, the superconductor material (such as YBCO) is secured at the proper location in the cryostat with mechanical and/or adhesive means to provide a load path for the levitation force from the superconductor material to the cryostat 110, from the cryostat 110 to the insulating mounting elements 140, and ultimately to the capsule 300, but without providing a heat path between the cryostat 110 and the capsule 300.

Magnetic force attachments 150 removably attach the cryostats 110 to the capsule 300. This enables rapid removal and replacement of the cryostats 110. This is advantageous because the magnetic force attachments 150 enable the cryostats 110 to be removed and replaced in the evacuated environment. The evacuated environment is ultra-insulated and ultra-dry to minimize heat transfer to the cryostats 110 so it is preferable that the cryostats 110 are removed and replaced prior to, or after, entry of the capsule into the airlock. This embodiment enables the capsules to be transferred through the airlock at standard temperature and pressure, while quickly enabling removal and replacement of the cryostats 110 with the magnetic force attachments 150 in the evacuated environment of the tube.

Automated Re-Freeze or Replacement Equipment:

Removable mounting allows automated means to remove any cryostat from inbound capsules, placed it in contact with cryogenic heat transfer fluids (such as LN2) that re-freeze the SL heat-sink material. And then the automated equipment 160 functions to replace any re-frozen, or already frozen reserve cryostat 110 onto outbound capsules 300. This minimizes airlock cycle time due to greater air displacement by the capsule 300 in the airlock chamber. It also results in fewer failure points or stress risers in the capsule pressure hull.

It can be appreciated that the automated equipment 160 have the capability to store a plurality of cryostats 110 in fully operational condition, i.e. fully frozen, to enable faster throughput of capsules 300 through any cryostat exchange area in systems employing tubes 200.

Use of SL phase change produces only a small volume change compared to a LG phase change. The SL heat sink material 120, preferably propane is placed in a sealed cryostat 110 with an empty or compressible volume 170 as required to allow for expansion and contraction of the liquid (and/or solid) material during normal operation and handling, and during the necessary thermal cycling of many melting and re-freezing cycles. The expansion mitigation means 170 can be empty space in the cryostat 110, a flexible membrane separating a portion of the cryostat 110, or a billows type of structure to allow for changes in volume without applying damaging pressures to the cryostat cylinder. One function of the expansion mitigation structures is to keep solid or liquid phase heat-sink in contact with the superconductor material 100 at all times.

Linear Motor/Generator:

An ETT-HTSM cryostat 110 can be provided with cooling capacity. A freezer element integral with or operably connected with the cryostat 110 regulates the temperature of the cryostat 100 to optimize operation between interchanges. Accordingly the freezer element is only operated when necessary to minimize energy consumption of any system utilizing tubes 200. One way of powering the freezer element to add additional capacity and cool superconductive elements 100 used for reaction members 180 that move, i.e. rotate or translate with respect to the tube 200 axis. The reaction members 180 operably connect with a Linear Electric Motor (LEM) or Linear Electric Generator (LEG) coils 182 mounted on the tube 200.

Embodiment with Permanent Magnet Elements 105 for HTS Reduction:

The stabilizing effect made available by any superconductor element 100 depends on the relative position in relation to the center of gravity of the capsule. Superconductor elements 100 mounted close to the capsule ends contribute a greater pitch and yaw restoring moment to the capsule than superconductor elements 100 situated close to the center of the capsule. A portion of the superconductor elements can be replaced with permanent magnet material 105 such as NdPM to reduce the cost with little loss to the stability while maintaining the required levitation force and suspension levitation gap.

Maglev Configuration for ET3:

The levitation force of HTSM is a function of the amount of force applied by the superconductor 100 (for instance YBCO), and permanent magnet 105 (for instance NdPM) that are configured to magnetically interact to levitate the capsule. To minimize cost, it is desirable to reduce the cross-sectional area of the permanent magnet material 105 in the tube guideway. A fixed quantity of superconductor material 100 is required to produce a given levitation force and levitation gap 108. To minimize the cost, the present invention spreads the required quantity of superconductor elements 100 out over the entire length of the capsule, resulting in a narrow strip of SC material 100. To have high roll stability, the superconductor material 100 is divided between the extreme top and bottom extremities of the capsule cross-section. This distribution results in high lateral, roll, pitch, and yaw stability; and also a small sectional area of the permanent magnet 105 material The permanent magnet material 105 (for example NdPM arranged in a Halbach array) is secured to the tube with structural permanent magnet mounts 106 that are non-conductive, and allow precision alignment adjustment of the permanent magnet elements 105 in relation to the tube structure to compensate for irregularities of the tube 200 surface or diameter; while maintaining the permanent magnet elements 105 in the proper alignment to produce uniform levitation force on the capsule components.

Intentional periodic discontinuities across the linear dimension of the permanent magnet mounts 106 allow for normal thermal expansion and contraction of the tube without introducing misalignment, high stress, or loss of integrity. The permanent magnet material 105 is preferably divided into small units in the linear direction with slight space between the elements enforced by a spacer 107 made from an elastic and dielectric material that is able to continuously compensate for linear movements caused by thermal variations and/or minor geological forces.

The elastic material 107 is dielectric to reduce magnetic drag forces, and also mitigate potential damage from electromagnetic pulse (such as caused by lightning strike). The dielectric permanent magnet coating material 107 (and/or permanent magnet mounting structure 106) is ideally made of low friction material (such that the permanent magnet elements 105 are free to slide in the linear direction so linear gap variations between individual permanent magnet elements 105 resulting from linear thermal deflections are uniform, yet accommodated at any expansion joints between tube sections as required by local conditions.

Levitation Height:

For low superconductor 100 and permanent magnet 105 material cost, the levitation gap 108 must be minimized; however for low construction cost of the reasonable tolerances are necessary indicating need for a large levitation gap 108. The optimal levitation gap 108 results in the lowest total system cost. ETT-HTSM allows for reduced gap 108 by: use of support structures that are ultra-stiff in the vertical, lateral, and torsional directions, use of precision alignment adjustment structures (such as opposing wedges, or locking threads, active alignment measuring and control that maintains the accurate alignment of the permanent magnet elements 105 even if the earth should move (refer to related application disclosing active alignment), Crash protection may be built into the linear motor components 182 and/or the cryostat 110 as is known to those in the arts. These components sustain damage first to protect the integrity of the pressure hull in the unlikely event of a crash.

Magnetic Drag Force Reduction:

Features of ETT-HTSM that contribute to low magnetic drag include avoidance of the use of electrically conductive elements in the capsule as well as the various other feature that are described below.

Sources of HTSM Drag:

Sources of drag include: plating of permanent magnet 105 or superconductor 100 elements; resistive conductivity of permanent magnet elements 105 or superconductor elements 100; iron or soft steel pole pieces; electrically conductive (metallic or carbon fiber) mounting materials. Magnetic field flux gradient variations in the linear direction may be caused by: magnet strength, magnet position variations, and magnet size or shape variations, and/or electrical conductivity variations. In addition stray magnetic fields "trapped" or "pinned" in the superconductor elements 100 (such as from earth fields or other fields that may vary according to capsule directional orientation.

Magnetic hysteresis losses from relative vertical and horizontal motion of the superconductor elements 100 in relation to the permanent magnet elements 105 such as caused by: vibrations of or capsule; variable vertical and horizontal forces (such as induced by load movements or curvilinear accelerations, or externally induced movements of earth or wind acting on; and or those internal to the system such as micro misalignment of permanent magnet material 105 in relation to the guideways, and/or macro misalignment of the guideways; and finally losses induced by deflections of the earth.

Minimization of Drag Forces:

Eddy currents in the permanent magnet 105 are minimized by using bonded materials that are not electrically conductive (but this results in less magnetic force and more material), or by using smaller physical dimensions in the plan view to minimize eddy current area and force.

Superconductor 100 and permanent magnet 105 elements are preferably coated with a non-conductive material.

In another embodiment, the superconductor 100 and permanent magnet 105 are coated with metallic or electrically conductive materials to maximize reflection of heat energy. However, the conductive elements should are oriented to minimize eddy currents, and maximize the distance from magnetic fields (generated by permanent magnet 105 or superconductor 110 elements in the 200 or capsule 300) that move relative to the conductive element.

Preferably the superconductor 100 and the permanent magnet 105 are coated with reflective materials such as metallized dielectric films to minimize radiant thermal heat gain to the cryostat 110. This is important because the temperature difference between portions of the capsule and portions of the cryostat 110 creates the potential for significant heat transfer via radiation.

When such metallized films are used for thermal radiation mitigation, a small portion or kerf of the reflective material can be burned off by laser (or photo etched, or masked) in a micro grid pattern to limit the formation of large eddy currents in the conductive layer but still reflect most thermal radiation energy.

When cooling superconductor elements 100 to the point of superconductivity in the presence of a magnetic field ensure that the field shape and distribution is identical to the magnetic flux field in the tube, and that the earth's field is either excluded by use of a Faraday cage shield, and/or aligned to coincide with the direction of the Earth's field for the major alignment especially those in high speed sections.

The present invention uses non-conductive permanent magnet material 105 for as much of the load carrying as possible; using just enough superconductor material 100 to achieve sufficient stability in worst case conditions. The invention electrically insulates conductive permanent magnet elements 105 from each other with dielectric materials 107 that also may function elastomerically as linear thermal stress mitigation (note that this also mitigates EMP risks).

The present invention uses accurate tube 200 and permanent magnet 105 alignment to minimize acceleration and levitation force variations and uses accurate and consistent permanent magnet 105 size, placement, spacing, strength, and field shape consistency. Tube 200 and capsule 300 utilize structural components that are very stiff in the vertical and lateral directions to minimize physical deflections. The present invention uses light weight capsules 300 to minimize tube 200 deflections and to protect capsule 300 and tube 200 from (or otherwise mitigate) variable loads such as but not limited to: side-wind loads, aerodynamic oscillations, earth movements, and payload movements.

Convergence and divergence between traffic flows in intersecting or bifurcating branches is automated for any predetermined fixed design speed at all times in interchange zones. Convergence frequency is characterized by design speed, predetermined capsule spacing, and converge timing and speed matching.

Divergence is characterized by activation of bi-stable magnetic diverging force elements in the capsule vehicle. Divergence force changes can only be activated prior to entering divergence zone. The system makes it physically impossible for divergence forces to be modified while capsule is diverging. Occupant can request a divergence, however divergence force not directly controlled by occupant.

Divergence forces balanced through CG (center of gravity) and through center of lift. The magnetic gradient generated by the permanent magnet material 105 can be shaped and configured to introduce a limited degree of freedom in the lateral direction as shown in FIG. 5.

The ETT-HTSM is capable of controlled freedom of movement in the lateral direction with little lateral force applied as shown in the force distribution graph below the progression of permanent magnet 105 and superconductor 100 sections in FIG. 4. The dotted lines labeled "NSF" to indicate normal steering force level, and "ESF" for exceptional or emergency steering force level. This degree of freedom is dimensionally expanded in the diverge zone so the width of the degree of lateral freedom (with low lateral force) becomes a little over double the normal width of the permanent magnet 105 strips in the normal (non-interchange) zone of the guideways. This allows additional magnetic elements 105 to be inserted in the middle of the widened the permanent magnet 105 strips (one along the bottom and top of the evacuated tubes) such that a magnetic gradient is introduced in the center of the strip creating two parallel zones with reduced lateral freedom, and then the permanent magnet 105 strips can bifurcate into two separate and parallel permanent magnet 105 strips that diverge into two separate tube routes. The converge zone is identical, except the direction of flow is reversed.

The permanent magnet 105 strips are typically mounted 180 degrees apart at the top and bottom of the tube in straight sections (at 12:00 and 6:00 positions in clock notation). In curves the permanent magnet 105 strips are smoothly rotated at an angle in curves to correspond to a natural bank angle producing no (or only slight) lateral acceleration force due to the curve-linear motion as shown in FIG. 6. The permanent magnet strips can be of greater cross-section to provide more levitation force as needed in vertical or horizontal curves that cause vertical accelerations on the capsule. The vertical force generating power of the components are not diminished in the converge/diverge zone.

ETT Interchange Elements:

Selectively polarized magnetic force generators are oriented in or on the capsule (or cryostats) to magnetically interact with ferromagnetic (and/or electromagnetic) material in corresponding areas in the tube to supply ample steering force to cause the capsule to diverge at any desired interchange. An interchange is a tube branch bifurcation.

Preferably, the active components in the vehicle cannot physically be activated during a interchange operation—the interchange operation is predetermined, either before the journey, or during an emergency situation in route. And the active components in the vehicle are not directly controlled by the occupant—the occupants diverge input is filtered by the control system. The lateral force generating magnetic elements 190 in the vehicle can be permanent magnet or electrically energized with DC current and is sometimes referred to as a switch element, or switch 190.

Permanent magnets oriented in repulsion are inherently unstable. This property of instability virtually guarantees safe operation because the ETT switch design uses the instability to advantage to create a bi-stable position—the vehicle is assured it will either continue on the line, or diverge. Alternatively a simple DPDT bi-stable electric switch can selectively energize electromagnet switch elements 190 (or reverse the direction of current flow to reverse the orientation of the magnetic force field) such that attractive or repulsive force can be selected to diverge or stay on the branch. An interrupter prevents the reorientation of switch elements while the vehicle is approaching and in the diverge zone.

For a converge, the capsule switch elements 190 are oriented to create a force that biases the capsule to follow the side of the tube 200 that is opposite the tube 200 to merge with. In this way there is no abrupt change in force when entering the zone of increased lateral freedom. If the switch 190 is improperly oriented by failure, there will be sudden lateral movement across the width of the permanent magnet 105 producing some lateral jerk and light impact force, however the force will be much less than the lateral magnetic restraining force the suspension elements are capable of sustaining This improper event is sensed by position sensors, and/or accelerometers in the capsule 300 and indicates a likelihood of a component failure in the switch elements 190 in the capsule, and the control system will flag the capsule for removal from service and repair at the next access portal.

Emergency Override:

In the rare event of a mechanical or electric switch failure in the capsule magnetic polarity mechanism or circuit, electromagnets 194 in the tube can be activated to overpower the magnets in the vehicle and force a divergence of the capsule at a desired branch of the tube 200.

Another reason for the simplicity and safety of the ETT switch 190 is that the tube 200 fully envelopes the capsule 300. In the extremely improbable event of an ETT failure, the vehicle will still continue by momentum down one side or the other of any diverge zone in the vehicle trajectory (assuming the vehicle is intact).

Convergence is strictly a timing issue, and converge timing may be controlled by motor phase that is hardwired in, and by design will not fail unless two or more exceptionally improbable failures occur at exactly the same time.

Note that both levitation and steering forces are balanced to pass very close to both the lateral and vertical centers of gravity of the capsule. The two points of magnetic suspension force are vertically separated by maximum distance allowed in the tube to generate a powerful roll couple for high stability in the event that a load shifts (or passengers jostle around) in the capsule.

It must be recognized that there are many embodiments that fall under the scope of this invention. For instance if other ways are used to ensure load stability (passenger and load restraints), then the capsules can be supported only from above (primarily in attraction). Future materials may obviate the need for the heat sink cyrostat 110, all the other elements function the same with the same load paths, and operation.

I claim:

1. A method of interchange of an evacuated tube transport system, comprising:
   a) automating convergence and divergence operations between capsule traffic flows on tube guideways in intersecting branches thereof of an evacuated tube transport system including evacuated tubes and magnetically levitated capsules configured to accommodate an occupant, without requiring direct control by the occupant;
   b) energizing switchable diverge force elements to allow the capsules on a tube guideway to either continue on the tube guideway or to diverge;
   c) preventing the reorientation of the switchable diverge force elements by means of an interrupter while the capsule vehicle is approaching or is in a diverge zone;
   d) predetermining the divergence by activation of bi-stable magnetic diverging force elements in the capsule vehicle, activating the diverging force elements prior to entering the divergence zone, and inhibiting modification of divergence forces while capsule diverges;
   e) balancing the divergence forces through center of gravity and through center of lift on receiving a request from the occupant of an ETT capsule for a divergence, wherein the occupant is not able to directly control the divergence force; and
   f) limiting the frequency only by predetermined speed, predetermined capsule spacing, converge timing and speed matching during the convergence of the tubes.

2. The method as set forth in claim 1, further comprising providing converging branches of tubes in the evacuated tube transport system, wherein for the converge operation the capsule switch elements biasing the capsule with respect to a side of a converging tube branch that is opposite another converging tube branch.

3. The method as set forth in claim 2, wherein the control system flags the ETT capsule for removal from service and repair in response to lateral movement of the capsule with respect to the guideway.

* * * * *